W. King.
Horse Rake
N° 63729  Patented Apr. 9, 1867.
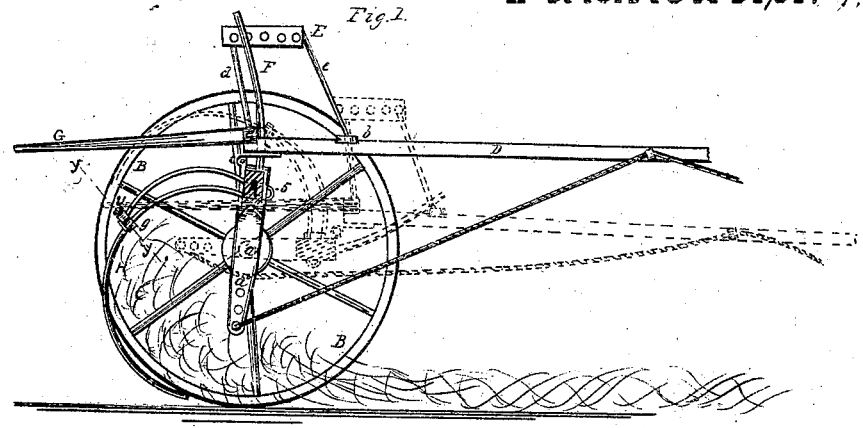
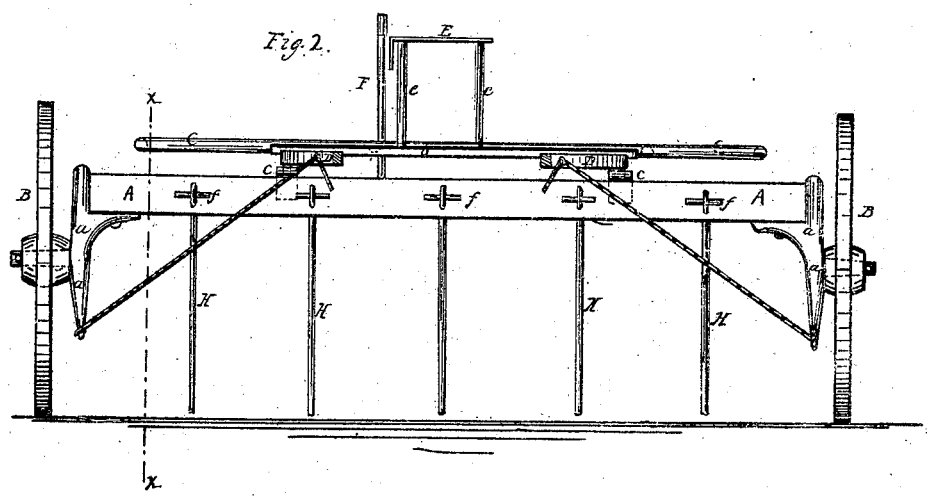
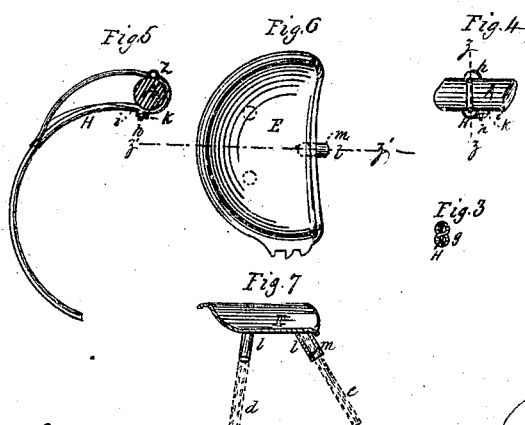
Witnesses  Inventor

United States Patent Office.

WATSON KING, OF SPRINGFIELD, ILLINOIS.

*Letters Patent No. 63,729, dated April 9, 1867.*

---

IMPROVEMENT IN HORSE-RAKES.

---

*The Schedule referred to in these Letters Patent and making part of the same.*

---

TO ALL WHOM IT MAY CONCERN:

Be it known that I, WATSON KING, of Springfield, Sangamon county, State of Illinois, have invented a new and improved Horse Hay-Rake; and I do hereby declare that the following is a full, clear, and exact description thereof, which will enable others skilled in the art to make and use the same, reference being had to the accompanying drawing, forming a part of this specification.

Figure 1 is a side sectional view of my rake taken in the line $x\,x$, fig. 2.

Figure 2 is a front view of the same, partly in section.

Figure 3 is a detail sectional view taken in the line $y\,y$, fig. 1.

Figure 4 is a rear view of a portion of the rake-head, the tooth being cut off.

Figure 5 is a cross-section taken in the line $z\,z$, fig. 4.

Figure 6 is a plan or top view of a driver's seat; and

Figure 7 is a vertical section of the same taken on the line $z'\,z'$, fig. 6.

Similar letters of reference indicate like parts.

This invention relates to a new and improved arrangement of means for operating a horse hay-rake so that it will easily be adjusted to its work and be raised and lowered with the greatest facility, and the invention also relates to an improved manner of attaching the rake teeth to the head, and also in a novel construction of the teeth; and the improvements consist—

First, in attaching the wheels to the under side of the rake-head by means of arms secured to either end of the head and in extending the said arms below the axle of the wheels and attaching the traces to these extensions, so that the horses will always tend to keep the teeth on the ground and will easily replace the same to their working position, after dumping, as soon as the head is slightly moved by a lever attached to the upper surface of the head, near to the driver's seat. Second, in hinging to the rear upper edge of the brake-head a long bar, to the front of which the thills are attached, while a series of straight long teeth extends horizontally from its rear, so that when the teeth are elevated for dumping these straight teeth will rake all the hay off the main teeth. By this arrangement the act of dumping is also greatly facilitated, as the driver's seat, which is attached to supports, extending upward from a cross-bar between the thills, and the long bar just mentioned, will be over this hinge, and as soon as the head is slightly displaced by the aforesaid lever the weight of the driver will at once bring down the thill-frame and thus turn the rake-head, as will hereafter be more fully shown. Third, my improvement consists in a novel mode of attaching the teeth to the head, which consists in bending the forward or upper end of each tooth over, so as to form a loop, through which the head is either passed and fastened by proper means or which loop is passed through a mortise in the head and then fastened by keys. That end of the tooth which is bent over presses upon the main body of the tooth and acts as a spring to keep the same on the ground, and is secured to it by a thimble or metal band passing around both thicknesses of the rake, as shown in the drawings. Fourth, my improvement consists in a novel manner of attaching the driver's seat to its supports, which is done by casting three or more sockets to the bottom of the seat into which the supporting rods fit, thus making the attachment at once firm, simple and cheap.

A represents the rake-head, to each end of which are firmly secured the crank-arms $a\,a$. The wheels B are hung upon these arms below the rake-head, as seen in fig. 2, and the traces of the harness are secured to the lower end of the arms below the axle of the wheels, as shown. C represents a long bar, almost as long as the rake-head, to whose rear side it is hinged by the hinges $e$ in such a manner that a space of two or three inches will be left between them and above the head when in the working position. D are the thills, which are fastened to the front side of the bar C, and which are strengthened by a cross-piece, $b$, which connects them. The driver's seat E is supported by the rods $d$ and $e$, the former fastened upon the bar C, the latter upon cross-piece $b$. The lever F is attached with its lower end to the upper surface of the rake-head A. A pin near its top, which works in holes or a slot in the side of the seat E, permits the driver to let the teeth more or less down. To the rear side of the bar C are attached the straight teeth G, which act as cleaners or scrapers, as has been already mentioned. The wire teeth H are secured to the rake-head by bending their front or upper ends up, forming a loop, said loop being inserted into a mortise in the head A and held there by a key, $f$. The part which is bent up acts as a spring on the tooth by pressing upon its upper surface, and is secured to the tooth by a thimble or metal band, $g$, which surrounds both parts of the tooth, as seen in figs. 1 and 3. The teeth H may also be fastened to the head by passing the loop over and around the head, securing them together by means of a staple pin, $h$, metal plate $i$, and nut $k$, as shown in figs. 4 and 5. But the spring which I gain by bending the wire tooth may also be applied with the same effect by making it independent of the tooth and securing it to the rake-head in any desired manner.

It will be seen by the above that when the rake is in working position and wants to be dumped a slight forward movement of the lever F will suffice to throw the centre of the hinges forward of the centre of the wheels, and then the weight of the driver will be sufficient to bring the rake into the position indicated by red lines in fig. 1, which is also the proper one for transporting the rake from one place to another. To bring the rake from this to the working position a slight pull on the lever F will give the horses enough power on the lower ends of the crank-arms $a$, which then act as levers, to throw the teeth down without any exertion on the lever. This rake will therefore almost adjust itself to any desired position, and as it is also very simple in construction, and not liable to get out of repair, it is certainly a very valuable improvement over any now in use. The seat E may be fastened to the supports $d$ and $e$ by attaching sockets $l$ to the under side of the seat, into which the upper ends of the rods $d$ and $e$ are inserted, and by securing the sockets to the rods by means of pins $m$, all of which is completely shown in figs. 6 and 7. By this method the seat is fastened securely and in a very simple manner, whereby cheapness and durability of construction are obtained.

I claim as new, and desire to secure by Letters Patent—

1. Extending the crank-arms $a$ below the axle of the wheels, so that the traces may be attached to these extensions, for the purposes herein shown and described.

2. The combination with bar C, the thills D, the cleaning teeth G, and hinges $c$, of the rake-head A, all arranged substantially in the manner and for the purpose herein shown and described.

WATSON KING.

Witnesses:
W. W. WATSON,
J. LA F. KING.